United States Patent
Feke

(10) Patent No.: US 10,876,840 B2
(45) Date of Patent: Dec. 29, 2020

(54) SECOND-ORDER PASSIVE RING INTERFEROMETER SENSOR AND METHOD

(71) Applicant: The Charles Stark Draper Laboratory, Inc., Cambridge, MA (US)

(72) Inventor: Gilbert D. Feke, Windham, NH (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 50 days.

(21) Appl. No.: 16/382,758

(22) Filed: Apr. 12, 2019

(65) Prior Publication Data

US 2019/0383614 A1    Dec. 19, 2019

Related U.S. Application Data

(60) Provisional application No. 62/775,308, filed on Dec. 4, 2018, provisional application No. 62/685,675, filed on Jun. 15, 2018.

(51) Int. Cl.
    *G01C 19/72* (2006.01)
(52) U.S. Cl.
    CPC ......... *G01C 19/727* (2013.01); *G01C 19/721* (2013.01)
(58) Field of Classification Search
    CPC ... G01C 19/721; G01C 19/722; G01C 19/727
    See application file for complete search history.

(56) References Cited

U.S. PATENT DOCUMENTS

| | | |
|---|---|---|
| 3,102,953 A | 9/1963 | Wallace |
| 4,821,276 A | 4/1989 | Alphonse et al. |
| 4,821,277 A | 4/1989 | Alphonse et al. |
| (Continued) | | |

FOREIGN PATENT DOCUMENTS

CN    102538776 B    9/2014

OTHER PUBLICATIONS

Fang, et al., "Polarization-entangled photon-pair generation in commercial-grade polarization-maintaining fiber," J. Opt. Soc. Am. B., vol. 31, No. 2, Feb. 2014.

(Continued)

*Primary Examiner* — Michael A Lyons
(74) *Attorney, Agent, or Firm* — Hamilton, Brook, Smith & Reynolds, P.C.

(57) ABSTRACT

A passive ring interferometer sensor includes an electromagnetic ring path configured to receive a pair of electromagnetic waves from an electromagnetic radiation source and to direct the waves to be counter-propagating within the ring path toward respective ends of the path. A combination junction receives the waves from the respective ends and combines the waves to be co-propagating within a coupling path. Polarization elements are configured to set the waves to be mutually co-polarized within the electromagnetic ring path and to be mutually cross-polarized within the coupling path. A detector is configured to receive the mutually cross-polarized waves from the coupling path and to detect second-order coherence. Embodiments can sense rotation rate as fiber-optic gyroscopes or serve as other types of sensors such as gravitational wave sensors. Embodiments may have greatly increased unambiguous range and decreased sensitivity to any centroid wavelength shift.

24 Claims, 17 Drawing Sheets

(56) References Cited

U.S. PATENT DOCUMENTS

| | | | |
|---|---|---|---|
| 4,958,355 A | 9/1990 | Alphonse et al. | |
| 6,417,524 B1 | 7/2002 | Alphonse | |
| 7,203,409 B2 | 4/2007 | Merritt et al. | |
| 9,041,934 B2* | 5/2015 | Qiu | G01C 19/72 356/460 |
| 9,158,057 B2 | 10/2015 | Alphonse | |
| 9,212,911 B1 | 12/2015 | Tal et al. | |
| 10,429,187 B1* | 10/2019 | Sanders | G01C 19/727 |
| 2015/0168126 A1 | 6/2015 | Nevet et al. | |
| 2015/0345950 A1* | 12/2015 | Yao | G01J 4/04 356/365 |
| 2016/0202063 A1* | 7/2016 | Yao | G01C 19/722 356/460 |
| 2018/0080770 A1 | 3/2018 | Chamoun et al. | |

OTHER PUBLICATIONS

Kamada, et al., "Magnetic Field Sensors based on a Ring Interferometry," IEEE Transactions on Magnetics, vol. 35, No. 5, Sep. 1999.

Chamoun, et al., "Aircraft-navigation-grade laser-driven FOG with Gaussian-noise phase modulation," Optics Letters, vol. 42, No. 8, Apr. 15, 2017.

Song, et al., High-Power Broad-Band Superluminiscent Diode with Low Spectral Modulation at 1.5-μm Wavelength, IEEE Photonics Technology Letters, vol. 12, No. 7, Jul. 2000.

Fu, et al., "Design and Realization of High-Power Ripple-Free Superluminescent Diodes at 1300 nm," IEEE Journal of Quantum Electronics, vol. 40, No. 9, Sep. 2004.

Lefèvre, "The Fiber-Optic Gyroscope," Second Edition, Artech House, pp. 1-489, 2014.

Pandey, et al., "Classical Light Sources with Tunable Temporal Coherence and Tailored Photon Number Distributions," pp. 1-17, Jul. 22, 2013.

Satapathy, et al., "Optical phase noise engineering via acousto-optic interaction and its interferometric applications," pp. 1-11, Sep. 10, 2012.

Hong, et al., "Limits on manipulating conditional photon statistics via interference of weak lasers," Optics Express, vol. 25, No. 9, May 2017.

Blumenstein, "Classical ghost imaging with opto-electronic light sources: novel and highly incoherent concepts," Dissertation, 145 pages, submitted: Feb. 7, 2017, Date of Examination: Apr. 19, 2017.

Hong, et al., "Two-photon super bunching of thermal light via multiple two-photon-path interference," 4 pages, Aug. 19, 2011.

Blazek, et al., "Unifying intensity noise and second-order coherence properties of amplified spontaneous emission sources," Optics Letters, vol. 36, No. 17, Sep. 1, 2011.

Lachs, "Theoretical Aspects of Mixtures of Thermal and Coherent Radiation," Physical Review, vol. 138, No. 4B, May 24, 1965.

Kiethe, et al., "Second-order coherence properties of amplified spontaneous emission from a high-power tapered superluminescent diode," 8 pages, Sep. 18, 2017.

Liu, et al., "High visibility temporal ghost imaging with classical light," 7 pages, Jul. 28, 2017.

Bai, et al., "Two-photon superbunching of pseudothermal light in a Hanbury Brown-Twiss interferometer," 8 pages, May 10, 2017.

Loudon, "Classical theory of optical fluctuations and coherence," The Quantum Theory of Light, pp. 82-124, Sep. 2000.

Boitier, "Two-photon absorption and quantum correlation effects in semiconductors," Thesis, Mar. 1, 2011.

Nevet, et al., "Second-order optical coherence tomography: deeper and turbulence-free imaging," J. Opt. Soc. Am. B., vol. 30, No. 2, Feb. 2013.

* cited by examiner

SECOND-ORDER PASSIVE RING INTERFEROMETER SENSOR AND METHOD

RELATED APPLICATIONS

This application claims the benefit of U.S. Provisional Application No. 62/685,675, filed on Jun. 15, 2018. This application also claims the benefit of U.S. Provisional Application No. 62/775,308, filed on Dec. 4, 2018. The entire teachings of the above applications are incorporated herein by reference.

GOVERNMENT SUPPORT

This invention was made with government support under N00030-13-C-0007 from Department of Defense. The government has certain rights in the invention.

FIELD

This disclosure relates generally to passive ring interferometers that may be used in optical gyroscopes, and more particularly to a second-order passive ring interferometer that may form part of a Sagnac optical gyroscope, as well as a related method of passive ring interferometric sensing using second-order coherence.

BACKGROUND

Passive Sagnac optical gyroscopes are known, for example as described in G. Sagnac, C. R. Hebd. Seances Acad. Sci. 157, 708 (1913), and in H. C. Lefèvre, The Fiber Optic Gyroscope, 2nd Edition, Boston: Artech House (2014). Passive Sagnac optical gyroscopes detect rotation by means of the Sagnac effect, also called Sagnac interference, named after French physicist Georges Sagnac, which is a phenomenon encountered in interferometry that is elicited by rotation.

The Sagnac effect manifests itself in a known apparatus called a ring interferometer. In known passive Sagnac optical gyroscopes, a beam of light from an external light source is split at the point of entry of the ring interferometer, and the two resulting light beams are made to follow reciprocal counter-propagating beam paths through the ring interferometer, i.e., the same beam path but in opposite directions. On return to the point of entry, the two light beams are allowed to exit the ring and undergo first-order interference, i.e., field interference. The relative phases of the two exiting beams, and thus the position of the first-order interference fringes, are shifted according to the angular velocity of the apparatus. In other words, when the interferometer is at rest with respect to a reference frame, the light travels at a constant speed. However, when the interferometer system is spun, one beam of light will slow with respect to the other beam of light. The position of the first-order interference fringes is detected by a photodetector. Passive Sagnac optical gyroscopes can include bulk optics, fiber optics and integrated waveguides.

SUMMARY

Known passive Sagnac optical gyroscopes that rely on first-order interference suffer from various limitations. One such limitation is scale factor instability. The induced phase shift between the counter-propagating light beams injected in the ring interferometer is proportional to the rotation rate, and that proportionality constant, called "scale factor," is itself inversely proportional to the mean wavelength, also known as the average or centroid wavelength, of the light beams as detected by the photodetector. For example, for a fiber-optic gyroscope, the scale factor can be calculated by the formula $2\pi L\sqrt{D}/\bar{\lambda}c$, where L is the length of the fiber coil, D is the diameter of the fiber coil, c is the speed of light in vacuum, and $\bar{\lambda}$ is the average, or centroid, wavelength of the light beams counter-propagating in the coil. Hence the accuracy of the gyroscope is limited by the accuracy by which $\bar{\lambda}$ of the light source is known, and instability of $\bar{\lambda}$ due to electronic drive fluctuations, environmental fluctuations, or component aging results in rotation measurement error.

As one example source of measurement error, external light sources that are based on superluminescent diodes (SLDs) are known to suffer from inherent centroid wavelength thermal sensitivity of typically +250 to +400 ppm/° C., and integrated temperature stabilization is typically invoked to reduce the sensitivity of SLDs to external thermal fluctuations. Other known external light sources, such as those based on rare-earth-doped superluminescent sources (REDSLSs), are also known to suffer from centroid wavelength thermal sensitivity due to environmental effects such as temperature fluctuations and exposure to ionizing radiation.

Another limitation of passive Sagnac optical gyroscopes that rely on first-order interference is the limited unambiguous dynamic range. For example, it is known that a passive Sagnac optical gyroscope, reliant on first-order interference, configured for using just one particular centroid wavelength, is limited to an unambiguous Sagnac phase shift of $\pm\pi$ radians. For applications where such a gyroscope is turned on while being in the unambiguous range and operating uninterrupted, it is known that it is possible to count the fringes that are passed and to keep a valid measurement over an extended dynamic range, but such fringe counting requires added complexity in the gyroscope electronics that becomes especially complex at high rotation rates due to the need for high-speed electronics.

Further, if such a gyroscope, reliant on first-order interference, experiences an interruption in operation for a period of time while it is rotating (for example if the gyroscope is turned off or if it experiences an environmental event that renders its Sagnac signal not representative of rotation), then, upon recovery from the interruption, it will suffer from ambiguity with respect to the amount of rotation that transpired during the period of time that the gyroscope was interrupted because of missing fringe counts. If several wavelengths are used, the phase measurement varies with the wavelength, and it is possible to recognize the fringe order, which increases the true unambiguous dynamic range. However, such multi-wavelength detection also has the drawback of requiring added complexity.

The inventor has recognized a need for an improved passive Sagnac optical gyroscope apparatus and method that overcome the limitations of known passive Sagnac optical gyroscopes that are reliant on first-order interference. More generally, a passive ring interferometer sensor, whether in the form of an optical gyroscope or any other sensor, is needed to overcome the deficiencies of passive ring interferometers that are reliant on first-order interference.

Accordingly, described herein is a passive ring interferometer sensor that relies on detection of second-order coherence. More specifically, embodiments may form a second-order passive Sagnac optical gyroscope apparatus or be used in a corresponding method.

In one embodiment sensor and corresponding method, a passive ring interferometer sensor includes an electromagnetic ring path configured to receive a pair of electromagnetic waves from an electromagnetic radiation source and to direct the pair of electromagnetic waves to be counter-propagating within the electromagnetic ring path toward respective ends of the electromagnetic ring path. The sensor further includes a combination junction configured to receive the pair of electromagnetic waves from the respective ends of the electromagnetic ring path and to combine the pair of electromagnetic waves to be co-propagating within a coupling path. Polarization elements included in the sensor are configured to set the pair of electromagnetic waves to be mutually co-polarized within the electromagnetic ring path and to be mutually cross-polarized within the coupling path. A detector forming part of the sensor is configured to receive the mutually cross-polarized pair of electromagnetic waves from the coupling path and to detect second-order coherence of the mutually cross-polarized electromagnetic waves.

The electromagnetic ring path may be an ultraviolet, x-ray, or gamma-ray ring path, with the pair of electromagnetic waves being, respectively, a pair of ultraviolet, x-ray, or gamma-ray waves; and with the electromagnetic radiation source being, respectively, an ultraviolet, x-ray, or gamma-ray source. The electromagnetic ring path may be an infrared or microwave-frequency ring path; the pair of electromagnetic waves may be, respectively, a pair of infrared or microwave-frequency waves; and the electromagnetic radiation source may be, respectively, an infrared or microwave-frequency source.

The electromagnetic ring path may be an optical ring path, with the pair of electromagnetic waves being a pair of optical waves. The sensor may further include the electromagnetic radiation source, and the electromagnetic radiation source can be a light source.

Where the waves are optical waves, the light source may be a broadband light source or a narrowband light source, and the light may be a broadband source light or a narrowband source light. "Optical" and "light," as used herein, encompass visible and near-infrared wavelengths, the sensor may further include at least one optical phase modulator. The optical phase modulator may be configured to receive the source light and to deliver conditioned output light having at least one of reduced spectral modulation depth and increased central degree of nth-order temporal coherence, characterized by a phase noise modulation enhancement factor, where n is an integer greater than or equal to 2, relative to the source light, the pair of optical waves formed from the conditioned output light.

A fiber optic gyroscope (FOG) may include any embodiment sensor described herein, with the FOG further including a processor configured to determine, from the second-order coherence of the mutually cross-polarized optical waves, a rotation rate of the optical ring path.

The optical ring path may include at least one of a bulk optic configured to direct the pair of optical waves therein; a bulk optic configured to direct the pair of optical waves through free space, at least a portion of the optical ring path being a free-space path; an integrated waveguide element; and an optical fiber or other waveguide. The optical ring path may include a polarizing or polarization-maintaining optical fiber or other waveguide. The coupling path may include at least one of a bulk optic or free space optical path, an integrated waveguide element, or an optical fiber or other waveguide.

The detector is a two-photon-absorption-based detector or a coincidence counting detector.

The electromagnetic radiation source may be configured to output electromagnetic radiation with a central degree of second-order temporal coherence greater than 1.0 or greater than 2.0.

The polarization elements may be Faraday rotators. The pair of electromagnetic waves may be linearly polarized within the optical ring path, within the coupling path, or both.

The combination junction may also be a splitter junction configured to split electromagnetic radiation from the electromagnetic radiation source to form the pair of electromagnetic waves. The combination junction may include at least one of a waveguide device and a bulk optic beam combiner.

In a further embodiment, a device includes means for receiving, at an electromagnetic ring path, a pair of electromagnetic waves from an electromagnetic radiation source; means for directing the pair of electromagnetic waves to be counter-propagating within the electromagnetic ring path toward respective ends of the electromagnetic ring path; means for combining the pair of electromagnetic waves, received from the respective ends of the electromagnetic ring path, to be co-propagating within a coupling path; means for polarizing the pair of electromagnetic waves to be mutually co-polarized within the electromagnetic ring path and to be mutually cross-polarized within the coupling path; and means for detecting second-order coherence of the mutually cross-polarized pair of electromagnetic waves, the mutually cross-polarized pair of electromagnetic waves received from the coupling path.

An embodiment apparatus may include a ring interferometer including an input axis and a pair of counter-propagating beam paths with respect to the input axis, a light source for delivering a light beam to the ring interferometer, and a photodetector for detecting the light beam from the ring interferometer and for delivering a Sagnac signal, wherein the light source provides light with central degree of second-order temporal coherence greater than 1.0, and wherein the photodetector is capable of detecting second-order interference.

Embodiment methods described herein may include providing a light source as a source of electromagnetic radiation, providing a ring interferometer, providing a photodetector, and detecting second-order interference, and may further include detecting first-order interference and using the detected second-order interference to stitch together first-order interference data across a data interruption.

In particular embodiments, the light source is a laser, a laser diode, a superluminescent diode (SLD), a rare-earth-doped superluminescent source (REDSLS), a light emitting diode (LED), or a supercontinuum fiber. In particular embodiments, the light source may include a conditioner to output light with increased linewidth, reduced spectral modulation depth, and/or increased degree of second-order temporal coherence. The conditioner may be a phase-noise modulator.

In particular embodiments, the electromagnetic ring path, or ring interferometer, is a nonzero-area ring interferometer or a zero-area ring interferometer. In particular embodiments, the ring interferometer is a bulk-optic ring interferometer, a fiber-optic ring interferometer, or an integrated-waveguide ring interferometer. In particular embodiments, a pair of Faraday rotators are included in the sensor and are configured such that the counter-propagating beams are co-polarized, and therefore reciprocal, within the ring interferometer, and cross-polarized upon exiting the ring interferometer.

In particular embodiments, the detector is a photodetector that includes a lens system and a two-photon photoreceiver. The lens system may be a non-immersion lens system, a liquid-immersion lens system, or a solid-immersion lens system. In particular embodiments, the photodetector includes a splitter, a pair of single-photon photoreceivers, and a coincidence counter.

In particular embodiments, a multi-order passive Sagnac optical gyroscope apparatus includes at least one second-order passive Sagnac optical gyroscope apparatus of the present disclosure, configured to deliver a second-order Sagnac signal, and at least one first-order passive Sagnac optical gyroscope apparatus, configured to deliver a first-order Sagnac signal, whereby the input axes of the second- and first-order optical gyroscope apparatuses are aligned, completely or partially. The second- and first-order optical gyroscope apparatuses may share their light source, ring interferometer, or both, or alternatively may have separate light sources and ring interferometers. The multi-order passive Sagnac optical gyroscope apparatus may further include a processor for interpreting the second-order Sagnac signal to stitch together the first-order Sagnac signal across one or more data interruptions.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate various embodiments and, together with the description, serve to explain principles and operation of the various embodiments.

BRIEF DESCRIPTION OF THE DRAWINGS

For a fuller understanding of the nature and objects of the disclosed embodiments, reference should be made to the following detailed description, taken in connection with the accompanying drawings, in which.

Figure 1:
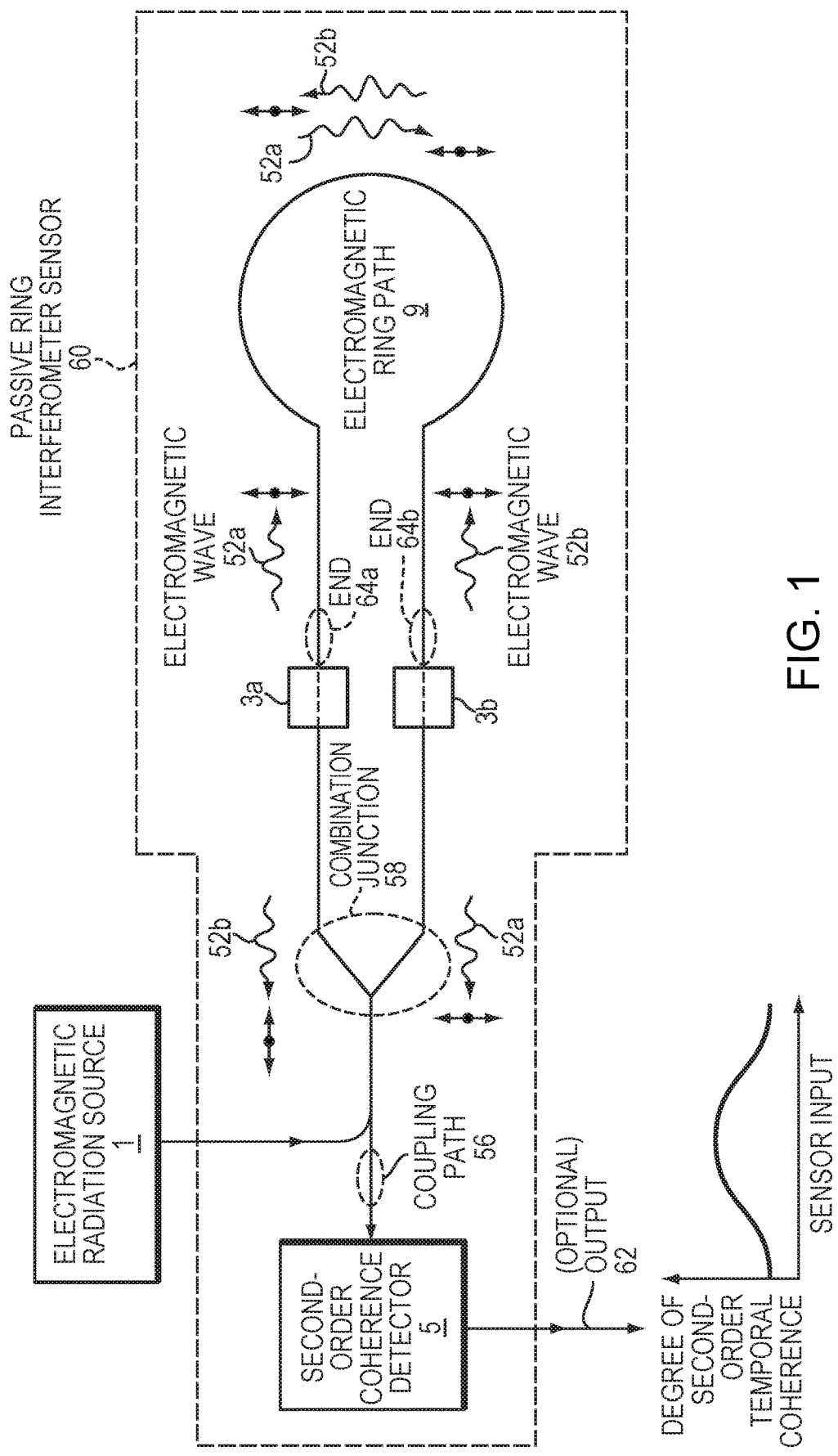
FIG. 1 is a schematic diagram illustrating an embodiment passive ring interferometer sensor that functions by detecting second-order coherence.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows. The following is a detailed description of the preferred embodiments of the invention, reference being made to the drawings in which the same reference numerals identify the same elements of structure in each of the several figures.

Figures shown and described herein are provided in order to illustrate key principles of operation and component relationships along their respective optical paths according to the present disclosure and are not drawn with intent to show actual size or scale. Some exaggeration may be necessary in order to emphasize basic structural relationships or principles of operations.

FIG. 1 is a schematic diagram illustrating an embodiment passive ring interferometer sensor 60 that functions by detecting second-order coherence. In particular, the sensor 60 includes an electromagnetic ring path 9 that is configured to receive a pair of electromagnetic waves 52a, 52b from an electromagnetic radiation source 1. The electromagnetic radiation source 1 may be described as common to both of the electromagnetic waves 52a, 52b because both of the waves 52a, 52b originate therefrom. In certain embodiments described hereinafter, a splitter is used to divide a light beam or other electromagnetic wave from an electromagnetic radiation source into two light beams or other electromagnetic waves. The electromagnetic ring path 9 is further configured to direct the pair of electromagnetic waves 52a, 52b to be counter-propagating within the ring path 9 toward respective ends 64b, 64a of the electromagnetic ring path 9.

The sensor 60 includes a combination junction 58 that is configured to receive the pair of electromagnetic waves 52a, 52b from the respective ends 64b, 64a of the electromagnetic ring path 9. The combination junction 58 is further configured to combine the pair of electromagnetic waves to be co-propagating within a coupling path 56 between the combination junction 58 and a second-order coherence detector 5. Polarization elements 3a, 3b of the sensor 60 are configured to set the pair of electromagnetic waves 52a, 52b to be mutually co-polarized within the electromagnetic ring path 9 and to be mutually cross-polarized within the coupling path 56. The electromagnetic waves may be linearly polarized while being mutually co-polarized within the ring path or while being mutually cross-polarized within the coupling path. Linear polarizations in both the ring and coupling paths apply in the embodiment described hereinafter in connection with FIGS. 2A-2C and 3A-3B, for example.

In various embodiments, the combination junction may include a Y-junction or evanescent waveguide coupler, or a beam combiner. Preferably, the combination junction also functions as a splitter junction configured to split electromagnetic radiation from the electromagnetic radiation source 1 to form the pair of electromagnetic waves. In this manner, the ring path 9 may receive the pair of electromagnetic waves via a combination/splitter combined junction. The combination junction may include a waveguide device, such as in the case of the integrated waveguide splitter/combiner described in connection with FIG. 3A, for example. However, in other embodiments, such as in the embodiment described in connection with FIG. 2A, for example, bulk optics serve the beam combining function, with the coupling path being at least partly a free-space coupling path.

Figure 8A:
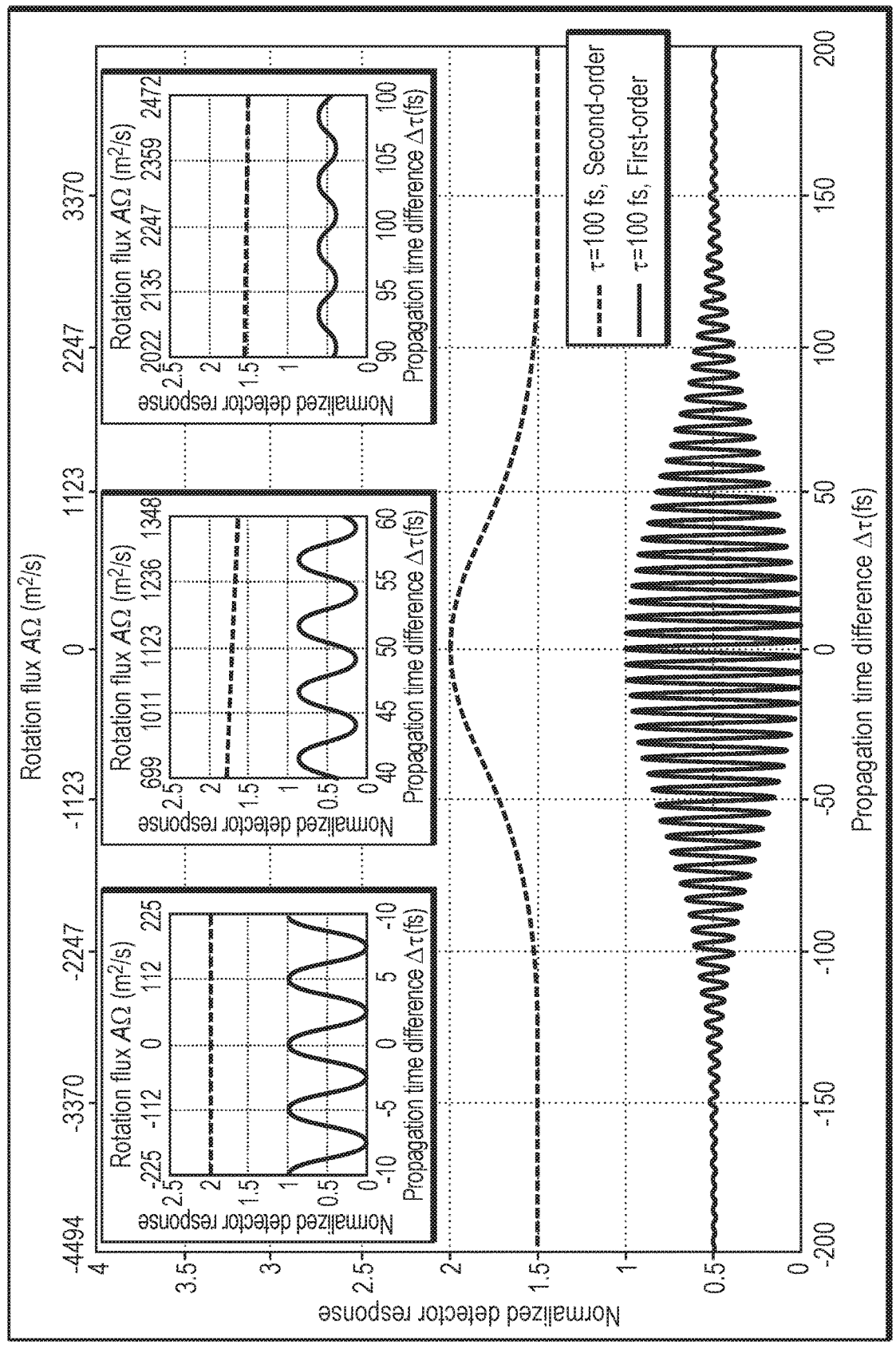
FIGS. 8A and 8B show exemplary normalized second-order interference detector responses for the second-order passive Sagnac optical gyroscope apparatus of the present disclosure along with corresponding exemplary normalized first-order interference detector responses.
Figure 8B:
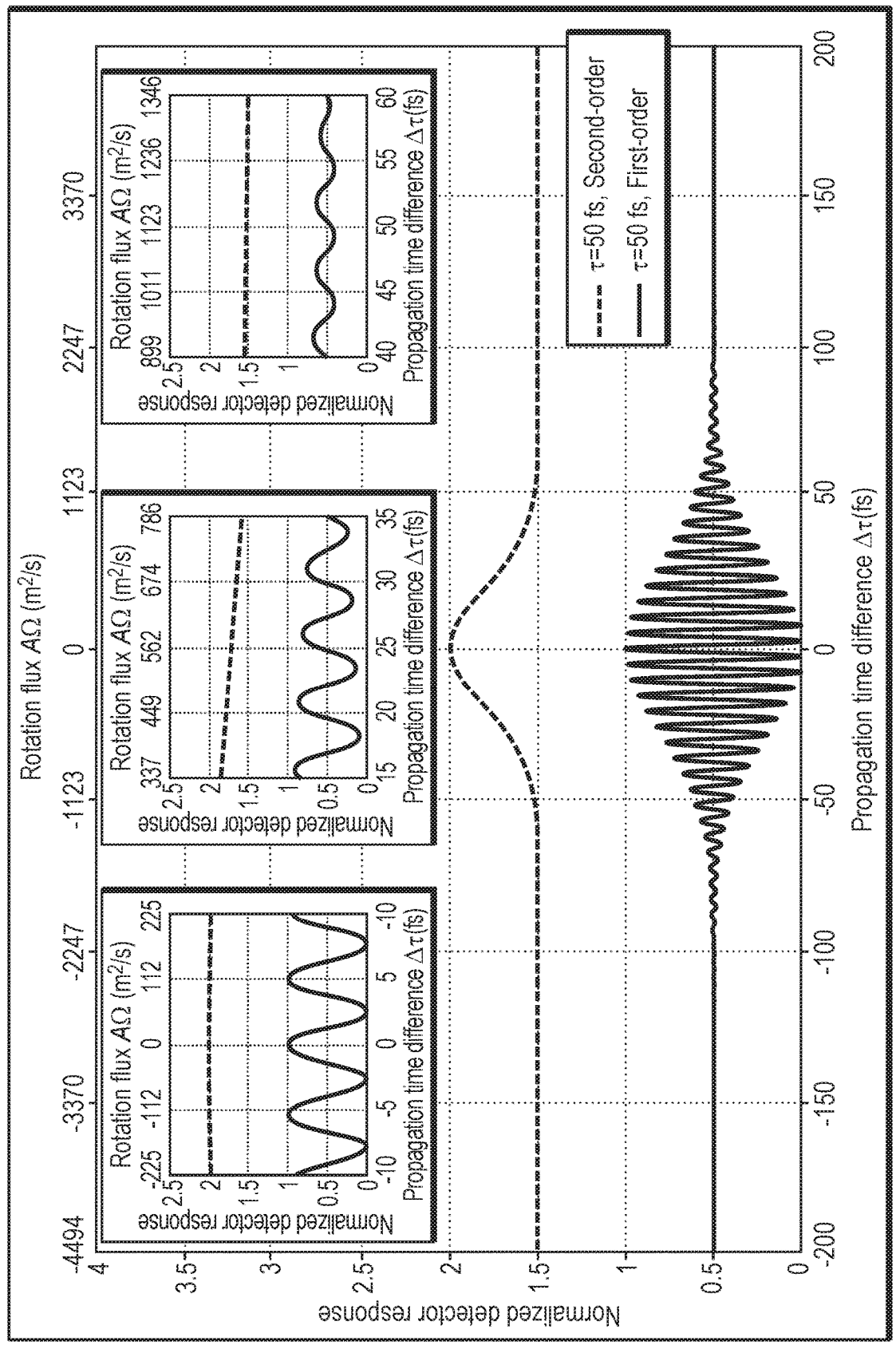

The second-order coherence detector 5 is configured to receive the mutually cross-polarized pair of electromagnetic waves 52a, 52b from the coupling path 56 and to detect second-order coherence of the mutually cross-polarized electromagnetic waves. As further illustrated in FIG. 1, the detector 5 may include an optional detector output 62 that includes results of the second-order coherence detection. In the example illustrated in FIG. 1, the optional output 62 includes a degree of second-order temporal coherence (arbitrary units) as a function of passive ring interferometer sensor input (arbitrary units) (the input to the passive ring interferometer sensor). In an example of the sensor 60 forming part of a gyroscope, the sensor input can be rotational rate of the electromagnetic ring path about the input axis of the electromagnetic ring path. Input axes are illustrated and described in connection with FIGS. 2A-2C and 3A-3B, for example. In other embodiments, this optional output may include either the degree of second-order temporal coherence or rotational rate (also referred to herein as "rotational velocity"), which can have a known relationship based on a calibration, as a function time during a particular mission or active time of use for the sensor 60, for example. The detector output 62 may be in the form of a normalized detector response, as illustrated in FIGS. 8A-8B, for example.

The sensor 60 may also be used as part of sensor to detect magnetic fields, electric fields, or gravitational waves, for example. In those cases, the sensor input can include, respectively, a magnetic field, an electric field, or a gravitational wave, respectively. Further in those cases, a processor may be configured to determine, from the second-order coherence of the mutually cross-polarized electromagnetic waves, the sensor input, specifically a magnetic field, an electric field, or a gravitational wave, respectively. Magnetic field sensing using ring interferometry has been described in "*Magnetic Field Sensors based on a Ring Interferometry*," O. Kamada, IEEE Transactions on Magnetics, Vol. 35, No. 5, September 1999, which is hereby incorporated herein by reference in its entirety. With the background of O. Kamada, and in view of the general disclosure herein for sensors and the specific disclosure herein related to gyroscope embodiments, a person of ordinary skill in the art would be enabled to make and use magnetic field sensors that particularly take advantage of second-order coherence detection to solve the problems described above that are associated with first-order coherence detection.

Furthermore, a person of ordinary skill in the art would be able to use known resources that relate to electric field detection and gravitational wave detectors, and in view of the disclosure provided herein, modify such detectors to take advantage of second-order coherence detection to solve the problems described above. Accordingly, the general embodiment passive ring interferometer sensor illustrated in FIG. 1 can be widely applicable and advantageous for sensing in many ways.

In many embodiments described herein, the electromagnetic ring path 9 illustrated in FIG. 1 is an optical ring path that is configured to direct optical waves (optical pulses, light beams, etc.) that include visible or near-infrared wavelengths, and the light waves may be received from a light source. These embodiments can be configured to detect rotation rate as part of a fiber-optic gyroscope (FOG) apparatus, for example. Various examples of light sources compatible with FOGs and other embodiment sensors are described herein. More broadly, embodiments may be used as other types of sensors besides FOG sensors. For example, some embodiment sensors are configured to operate as gravitational wave sensors, as further described in connection with FIG. 2C, for example.

The electromagnetic ring path 9 is also referred to herein as a "ring interferometer." In particular embodiments, such as in the embodiment described hereinafter in connection with FIGS. 2A-2B, the ring interferometer may include a bulk-optic ring interferometer, in which the bulk optics direct the pair of electromagnetic waves through free-space portions of the ring. In other embodiments, such as in the embodiment described in connection with FIG. 3A, the path 9 may include a fiber-optic ring interferometer. In still other embodiments, the electromagnetic ring path 9 is an integrated-waveguide ring interferometer. The ring path 9, combination junction 58, coupling path 56, or any combination thereof may be provided in the form of one or more integrated optical components in various embodiments.

In some embodiments, the electromagnetic ring path includes polarizing or polarization-maintaining optical fiber or other optical waveguide. Such polarizing or polarization-maintaining optical fiber may assist to set or to maintain the pair of electromagnetic waves (optical waves, in this case) to be mutually co-polarized within the electromagnetic ring path.

As used herein, "light" and "optical" refer to visible and near-infrared wavelengths, with near-infrared including wavelengths covering the range from 0.78 μm to 3 μm, as specified in the ISO 20473 standard. All terms herein including "infrared" without "near" include mid-infrared (3-50 μm) and far-infrared (50-1000 μm), as specified in the ISO 20473 standard.

Consistent with particular optical embodiments, the electromagnetic radiation source 1 (i.e., light source in these embodiments) may include a laser, a laser diode, a superluminescent diode (SLD), a rare-earth-doped superluminescent source (REDSLS), a light emitting diode (LED), or a supercontinuum fiber, for example. Further, in particular embodiments, the light source may include a conditioner to output light with increased degree of second-order temporal coherence. The conditioner may be a phase-noise modulator.

In other embodiments, however, the sensor is configured to operate in an ultraviolet, x-ray, or gamma-ray wavelength range. In these embodiments, the electromagnetic ring path, electromagnetic waves, and electromagnetic radiation source are configured accordingly. The electromagnetic ring path may be an ultraviolet, x-ray, or gamma-ray ring path, with the pair of electromagnetic waves being, respectively, a pair of ultraviolet, x-ray, or gamma-ray waves; and with the electromagnetic radiation source being, respectively, an ultraviolet, x-ray, or gamma-ray source. Where embodiments use x-ray or gamma-ray electromagnetic waves, they may include some components similar to those described in U.S. Pat. No. 3,102,953 to Wallace, for example, which is hereby incorporated herein by reference in its entirety.

In still other embodiments, the sensor 60 is configured to operate in an infrared or microwave-frequency wavelength range. In these embodiments, the electromagnetic ring path 9, pair of electromagnetic waves 52a, 52b, and electromagnetic radiation source 1 are configured accordingly. The electromagnetic ring path may be an infrared or microwave-frequency ring path; the pair of electromagnetic waves may be, respectively, a pair of infrared or microwave-frequency waves; and the electromagnetic radiation source 1 may be, respectively, an infrared or microwave-frequency source. Where embodiments use microwave-frequency electromagnetic waves, they may include some components similar to those described in U.S. Pat. No. 9,212,911 to Tal et al., for example, which is hereby incorporated herein by reference in its entirety.

In certain embodiments, particularly where optical wavelengths are used, the electromagnetic radiation source 1 is a broadband light source or a narrowband light source that is configured to output broadband source light or narrowband source light, respectively. As used herein, "broadband" source light denotes light with a spectrum having a full width at half maximum (FWHM) greater than or equal to 1 nm. The source 1 may include at least one optical phase modulator that is configured to receive the source light and to deliver conditioned output light having at least one of reduced spectral modulation depth and increased central degree of nth order temporal coherence characterized by a phase noise modulation enhancement factor relative to the source light, where n is an integer greater than or equal to 2. The pair of optical waves may be formed from the conditioned output light.

In a particular example, in the case of n=2, the light source or other electromagnetic radiation source may be configured to output electromagnetic radiation with a central degree of second-order temporal coherence greater than 1.0, greater than 1.5, greater than 2.0, between about 1.0 and about 1.5, between about 1.5 and about 2.0, or between about 1.0 and about 2.0, for example. The central degree of second-order temporal coherence is defined in U.S. Provisional App. No. 62/685,675, filed on Jun. 15, 2018, which is incorporated by reference herein in its entirety. Further, FOGs and other passive ring interferometer sensors described herein may incorporate or otherwise receive electromagnetic light waves from any phase noise-modulated broadband light source apparatus, or using any method, described therein.

In particular embodiments, providing the detector may include one or more photodetectors (also referred to herein as "photoreceivers"), such as those described in connection with FIG. 6; an objective lens or lens system, such as those described in connection with FIGS. 4 and 5A-5C; a two-photon photoreceiver, such as described in connection with FIGS. 4 and 5A-5C; or any combination thereof, for example.

In particular embodiments, the photodetector may include a splitter, a pair of single-photon photoreceivers, and a coincidence counter, as described in connection with FIG. 6, for example.

Figure 2A:
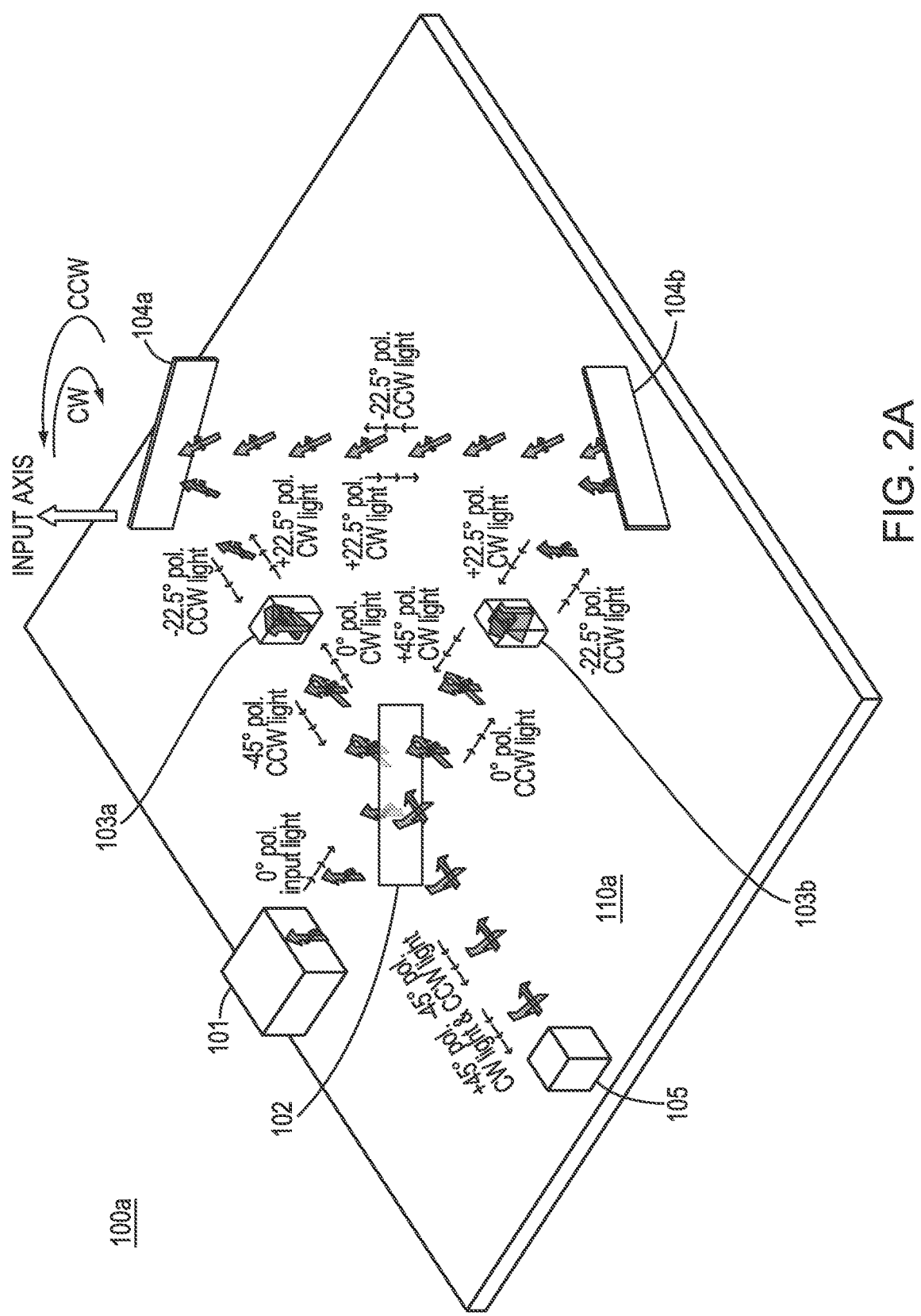
FIG. 2A is a schematic diagram of a second-order passive Sagnac optical gyroscope apparatus including a bulk-optic nonzero-area ring interferometer in accordance to an embodiment of the present disclosure.

FIG. 2A is a schematic diagram of an embodiment passive ring interferometer sensor, in particular a second-order passive Sagnac optical gyroscope apparatus 100a. The apparatus 100a includes an example electromagnetic ring path, in this case a bulk-optic nonzero-area ring interferometer 110a having an input axis as shown, in accordance to an embodiment of the present disclosure. In the embodiment of FIG. 2A, the ring interferometer 110a forms an electromagnetic radiation path that lies in plane, and the input axis may be considered to be perpendicular to the plane of the electromagnetic radiation path. However, in other embodiments, the electromagnetic radiation path is not strictly planar.

Apparatus 100a further includes an electromagnetic radiation source 1, particularly a light source 101, and a second-order coherence detector, particularly a photodetector 105 in this embodiment. Light source 101 delivers an electromagnetic wave, which is particularly referred to as a "beam of light" here, including a visible or near-infrared wavelength. In this embodiment, the beam of light is linearly polarized light, with 0° polarization angle with respect to the input axis, as illustrated in FIG. 2A. The beam of light has a central degree of second-order temporal coherence greater than 1. The beam of light is delivered to a beamsplitter 102 of ring interferometer 110a.

Beamsplitter 102 splits the entry beam into first and second electromagnetic waves (also referred to as "beams") that are counter-propagating within the ring interferometer path 110a. The first beam path propagates clockwise (CW) with respect to the input axis, and the second beam propagates counterclockwise (CCW) with respect to the input axis, in the ring interferometer 110a, according to the angles of incidence and reflection of mirrors 104a and 104b of ring interferometer 110a. Accordingly, the ring interferometer 110a receives the pair of beams from the light source 101 via the beamsplitter 102. Faraday rotators 103a and 103b of ring interferometer 110a are configured such that the counter-propagating beams are co-polarized, and therefore reciprocal, within the ring interferometer, and cross-polarized upon exiting the ring interferometer, within the coupling path between the beamsplitter 102 and the detector 105.

Figure 2B:
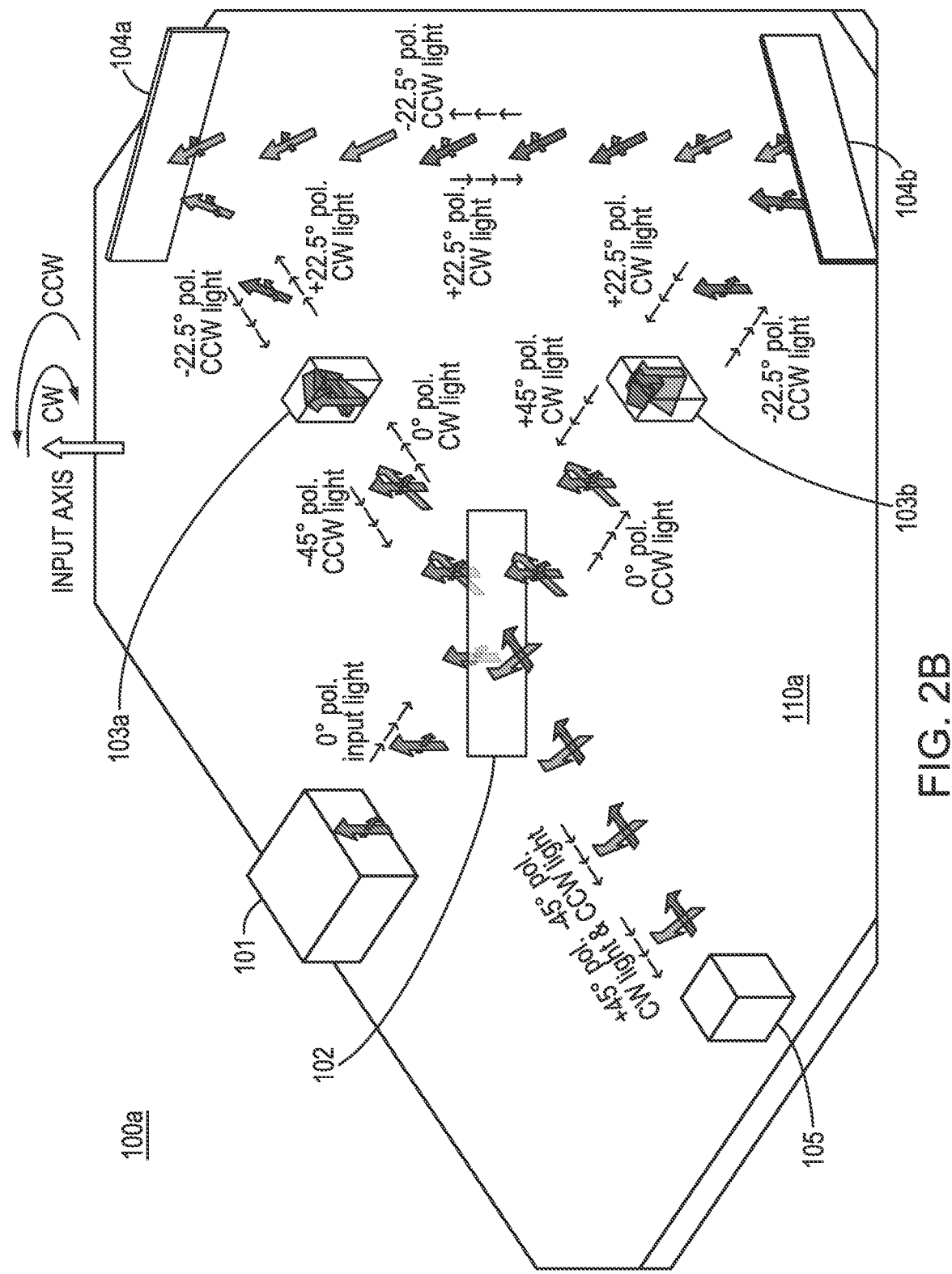
FIG. 2B shows a detailed view of the schematic diagram of FIG. 2A.

FIG. 2B is a schematic diagram illustrating a portion of the same second-order passive Sagnac optical gyroscope apparatus 100a as illustrated in FIG. 2A, but magnified to illustrate greater detail than FIG. 2A. In the embodiment shown in FIGS. 2A and 2B, Faraday rotator 103a rotates the polarization angle of the clockwise-propagating beam from 0° to +22.5° and the polarization angle of the counterclockwise-propagating beam from −22.5° to −45°, while Faraday rotator 103b rotates the polarization angle of the counterclockwise-propagating beam from 0° to −22.5° and the polarization angle of the clockwise-propagating beam from +22.5° to +45°. Beamsplitter 102 further recombines the two counter-propagating, cross-polarized exit beams (±45° in the example shown) and delivers the resultant combined (coupled) beam to photodetector 105, which is capable of detecting second-order interference present in the resultant combined beam.

Figure 2C:
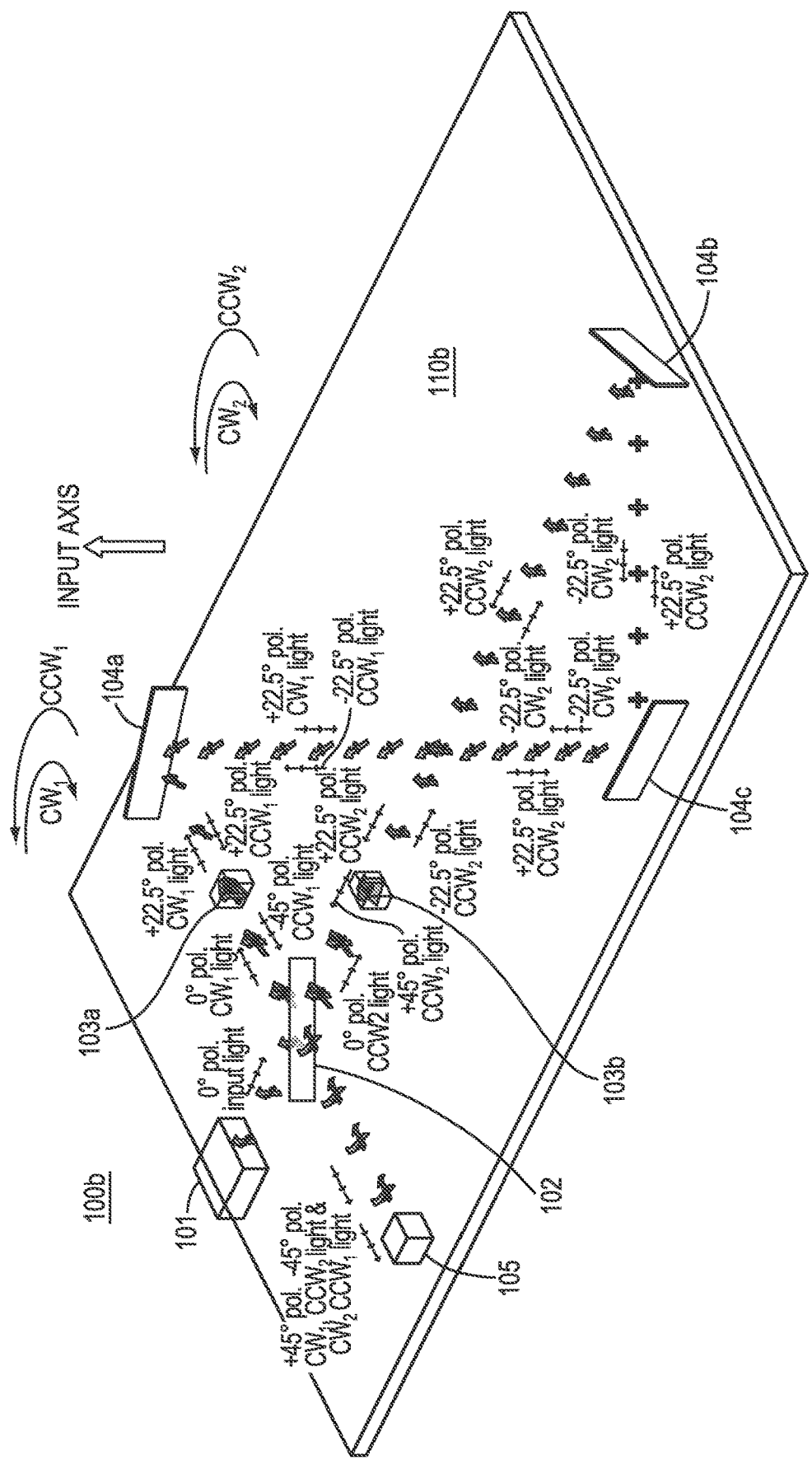
FIG. 2C is a schematic diagram of a second-order passive Sagnac optical gyroscope apparatus including a bulk-optic zero-area ring interferometer in accordance to another embodiment of the present disclosure.

FIG. 2C is a schematic diagram of a second-order passive Sagnac optical gyroscope apparatus 100b including a bulk-optic zero-area ring interferometer 110b having an input axis as shown, in accordance to another embodiment of the present disclosure. Apparatus 100b includes the same elements as apparatus 100a of FIGS. 2A-2B, except mirror 104b is omitted and mirrors 104c and 104d are added. These changes convert nonzero-area ring interferometer 110a into a zero-area ring interferometer 110b including first and second equal subareas (denoted by subscripts 1 and 2, respectively, in FIG. 2C). The first beam propagates clockwise in the first subarea and counterclockwise in the second subarea, and the second beam propagates counterclockwise in the first subarea and clockwise in the second subarea.

Apparatus 100b, having zero-area ring interferometer 110b, is insensitive to rotation and is, therefore, particularly useful for detection of gravitational waves, as known in the art. Accordingly, apparatus 100b is an example of an embodiment second-order passive ring interferometer sensor that is not configured to function as a gyroscope.

Figure 3A:
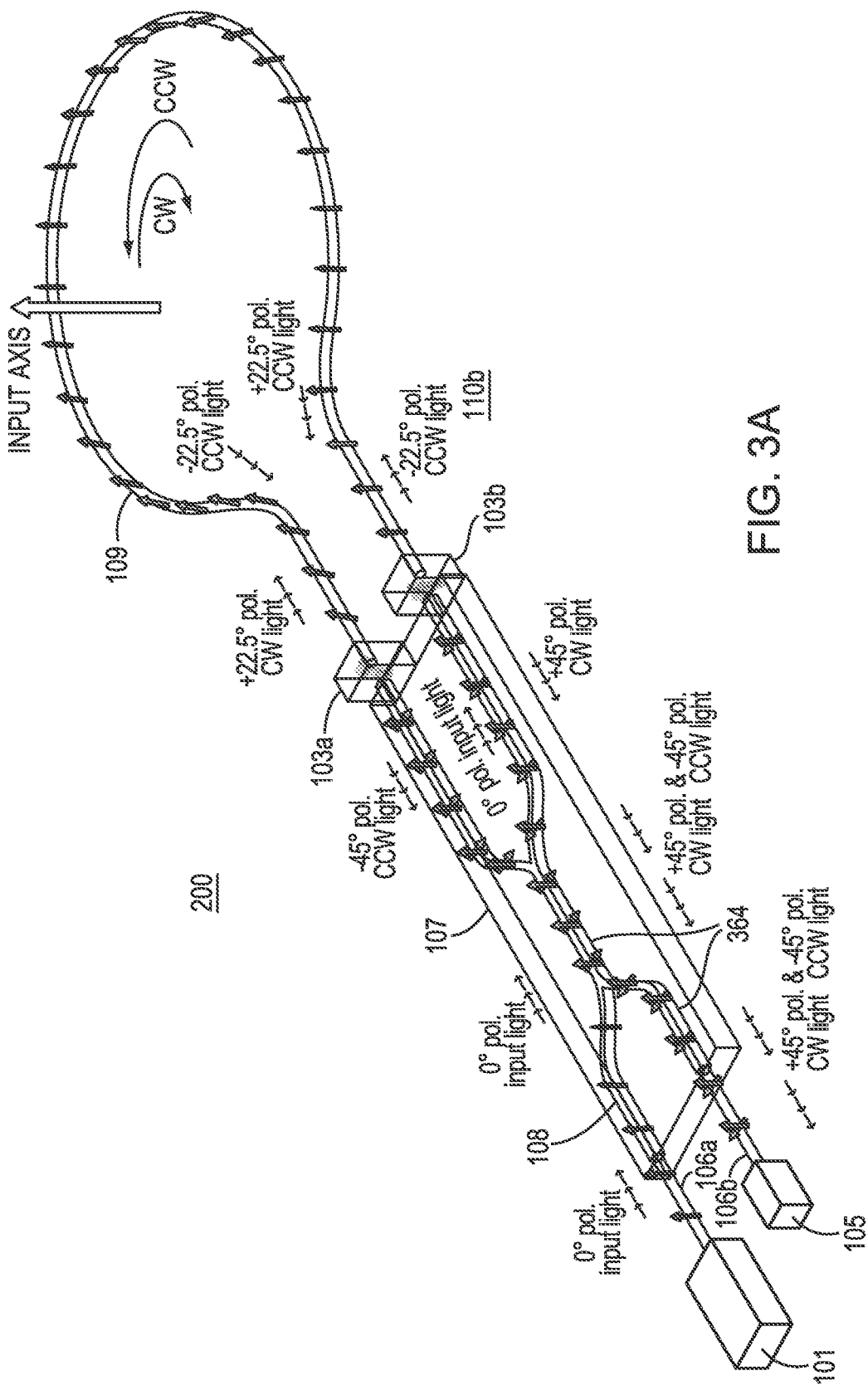
FIG. 3A is a schematic diagram of a second-order passive Sagnac optical gyroscope apparatus including a fiber-optic nonzero-area ring interferometer in accordance to another embodiment of the present disclosure.

FIG. 3A is a schematic diagram of a second-order passive Sagnac optical gyroscope apparatus 200 including a fiber-optic nonzero-area ring interferometer 109 having an input axis perpendicular to a plane in which the ring interferometer lies, as shown, in accordance to another embodiment of the present disclosure. Apparatus 200 further includes light source 101 and photodetector 105. Light source 101 delivers a beam of light (entry beam), for example polarized light with 0° polarization angle as shown, with central degree of second-order temporal coherence greater than 1, to an input port of guided path 108 of coupler 107 (also referred to herein as a "combination junction") of ring interferometer 109.

The coupler 107 (combination junction) included in gyroscope apparatus 200 also functions as a splitter junction and splits the entry beam from the light source 101 into first and second beams that are directed to be counter-propagating within the ring path. The first beam propagates clockwise (CW) in the ring path with respect to the input axis, while the second beam propagates counterclockwise (CCW) in the ring path with respect to the input axis. Faraday rotators 103a and 103b of ring interferometer 109 are configured such that the counter-propagating beams are set to be mutually co-polarized, and therefore reciprocal, within the ring interferometer light path, and mutually cross-polarized upon exiting the ring interferometer 109 through the respective Faraday rotators. The first and second beams remain mutually cross-polarized (in this case, with respective linear polarizations of ±45°, within a coupling path 364 between the coupler 107 and the detector 105.

Figure 3B:
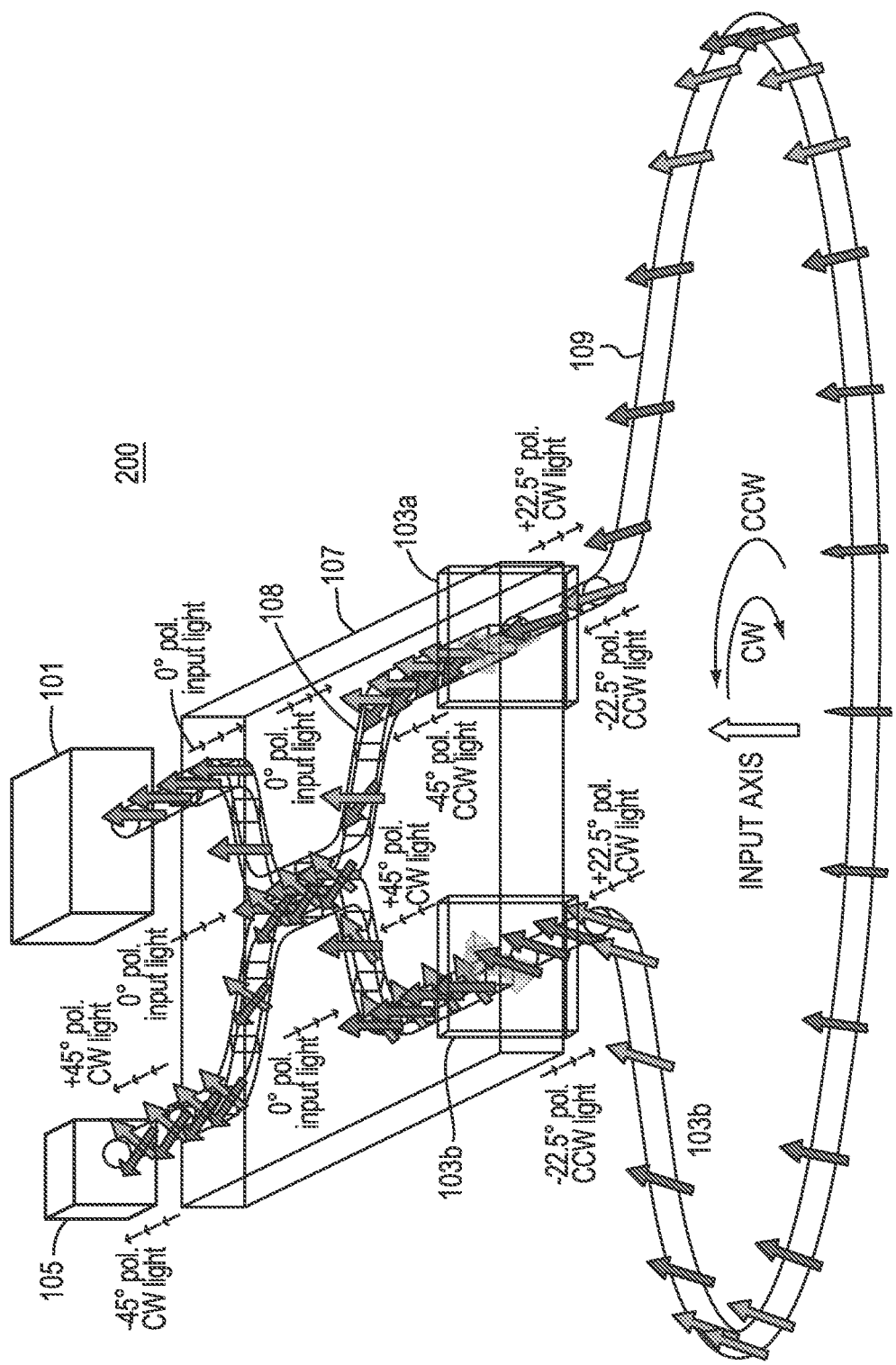
FIG. 3B shows an alternate view of the schematic diagram of FIG. 3A.

In the embodiment shown in FIG. 3A and in greater detail in FIG. 3B, Faraday rotator 103a rotates the polarization angle of the clockwise-propagating beam from 0° to +22.5° and the polarization angle of the counterclockwise-propagating beam from −22.5° to −45°, while Faraday rotator 103b rotates the polarization angle of the counterclockwise-propagating beam from 0° to −22.5° and the polarization angle of the clockwise-propagating beam from +22.5° to +45°. Coupler 107 further recombines the two counter-propagating cross-polarized exit beams (±45° in the example shown) and delivers the resultant combined beam to photodetector 105, which is capable of detecting second-order interference present in the resultant combined beam.

The beams delivered from light source 101 to coupler 107 and from coupler 107 to photodetector 105 may be delivered by fiber optic pigtails 106a and 106b, respectively, or alternatively by free-space delivery or other means known in the art.

Although the schematic diagrams of the ring interferometers 110a, 110b, and 109 shown in FIGS. 2A-3B are depicted as single loops, generally embodiment ring interferometers of the present disclosure may consist of multiple loops, as formed by multiple mirrors for bulk-optic ring interferometers, for example, or as formed by multiple windings of a coil of optical fiber for fiber-optic ring interferometers, for example. An advantage of multiple loops is that they increase area of the ring interferometer, such that sensitivity can be greatly increased.

Light source 101 may be a laser, a laser diode, a superluminescent diode (SLD), a rare-earth-doped superluminescent source (REDSLS), a light emitting diode (LED), or a supercontinuum fiber, for example.

Light source 101 may include a conditioner to output light with reduced spectral modulation depth and/or increased degree of second-order temporal coherence. The conditioner may be a phase-noise modulator, as described in U.S. Patent Application No. 62/685,675, filed on Jun. 15, 2018, which is hereby incorporated herein by reference in its entirety; and as described in the U.S. patent application entitled "Phase Noise-Modulated Broadband Light Source Apparatus and Method," which is being filed on even date herewith, which lists inventor Gilbert D. Feke, and which is hereby incorporated herein by reference in its entirety.

Figure 4:
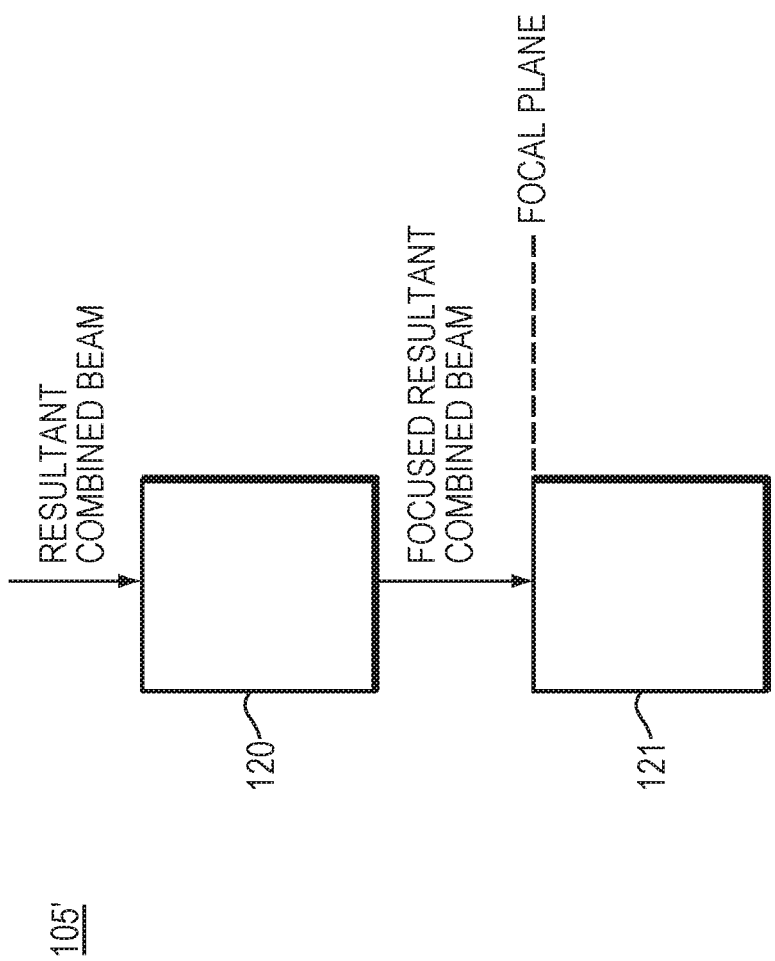
FIG. 4 is a schematic diagram of an embodiment photodetector of the second-order passive Sagnac optical gyroscope apparatuses of FIGS. 2A-3B including a lens system and a two-photon photoreceiver.

Referring to FIG. 4, according to a further embodiment, photodetector 105' of the second-order passive Sagnac optical gyroscope (or other passive ring interferometer sensor) of the present disclosure includes a lens system 120 that receives the resultant combined beam and delivers a focused resultant combined beam to two-photon photoreceiver 121 according to a focal plane of lens system 120. Two-photon photoreceiver 121 may include a photodiode, avalanche photodiode, or photomultiplier tube as known in the art, and is capable of direct detection of second-order interference.

Figure 5A:
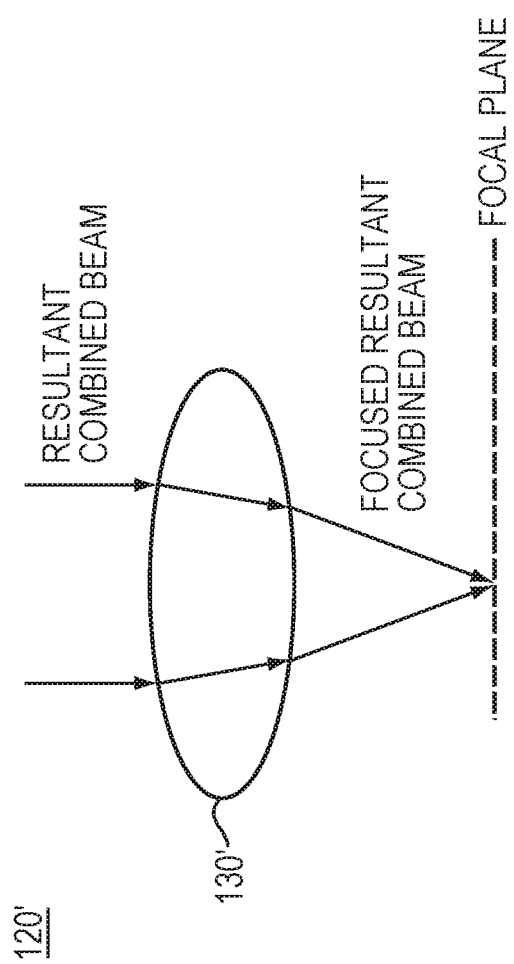
FIG. 5A is a schematic diagram of an embodiment lens system of FIG. 4 including a non-immersion lens.
Figure 5B:
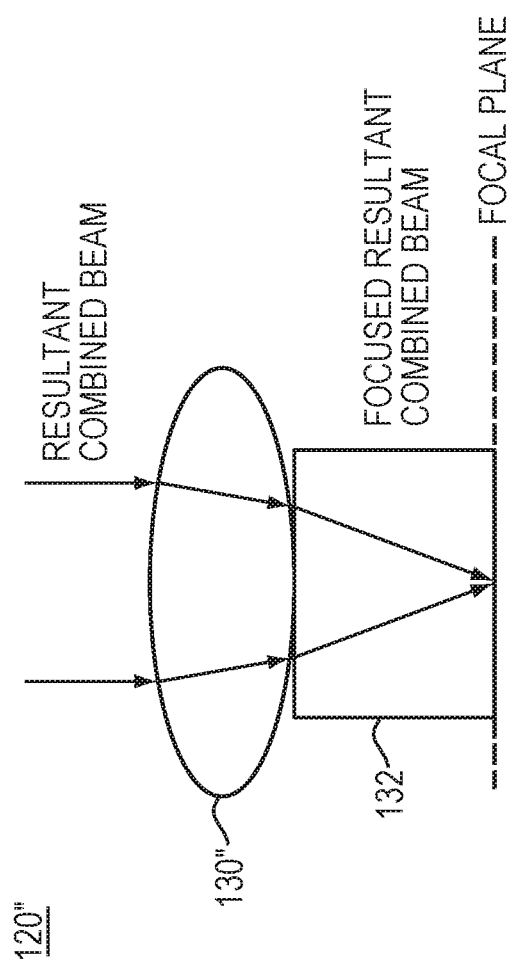
FIG. 5B is a schematic diagram of an embodiment lens system of FIG. 4 including a liquid-immersion lens.
Figure 5C:
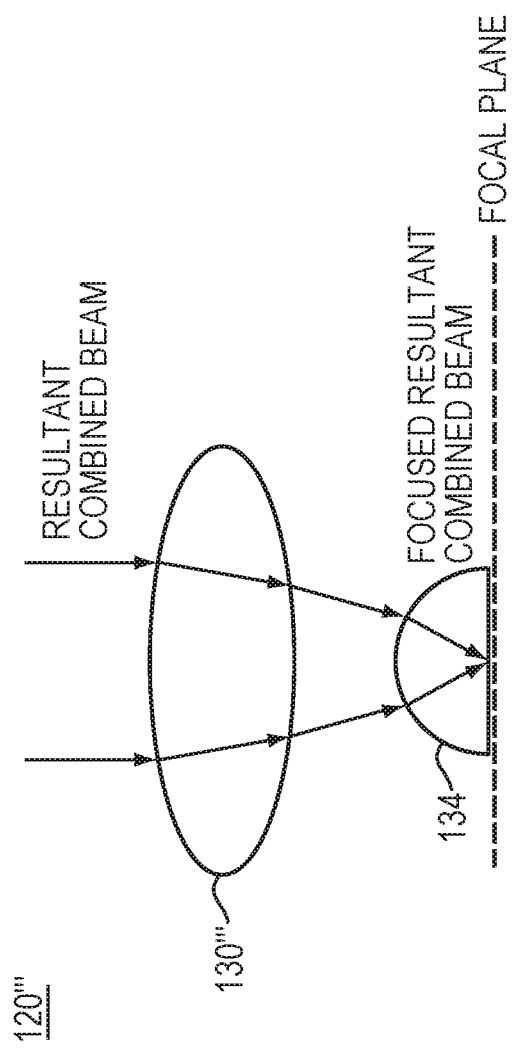
FIG. 5C is a schematic diagram of an embodiment lens system of FIG. 4 including a solid-immersion lens.

FIGS. 5A-5C are schematic diagrams of various embodiments of lens system 120. FIG. 5A is a schematic diagram of a non-immersion lens system 120' including a non-immersion objective lens 130', illustrating a focusing of the resultant combined beam. FIG. 5B is a schematic diagram of a liquid-immersion lens system 120" including a liquid-immersion objective lens 130" and an immersion liquid 132, which may include oil, water, or another liquid as known in the art, showing a focusing of the resultant combined beam with greater numerical aperture, and therefore greater two-photon responsivity, than is typically achievable with non-immersion lens systems.

FIG. 5C is a schematic diagram of solid-immersion lens system 120''' including solid-immersion objective lens 130''' and solid-immersion hemisphere 134, illustrating the focusing of the resultant combined beam with greater numerical aperture, and therefore greater two-photon responsivity, than is typically achievable with liquid- and non-immersion lens systems. In particular embodiments, solid-immersion hemisphere 134 may be affixed to a photoactive area of two-photon photoreceiver 121.

Figure 6:
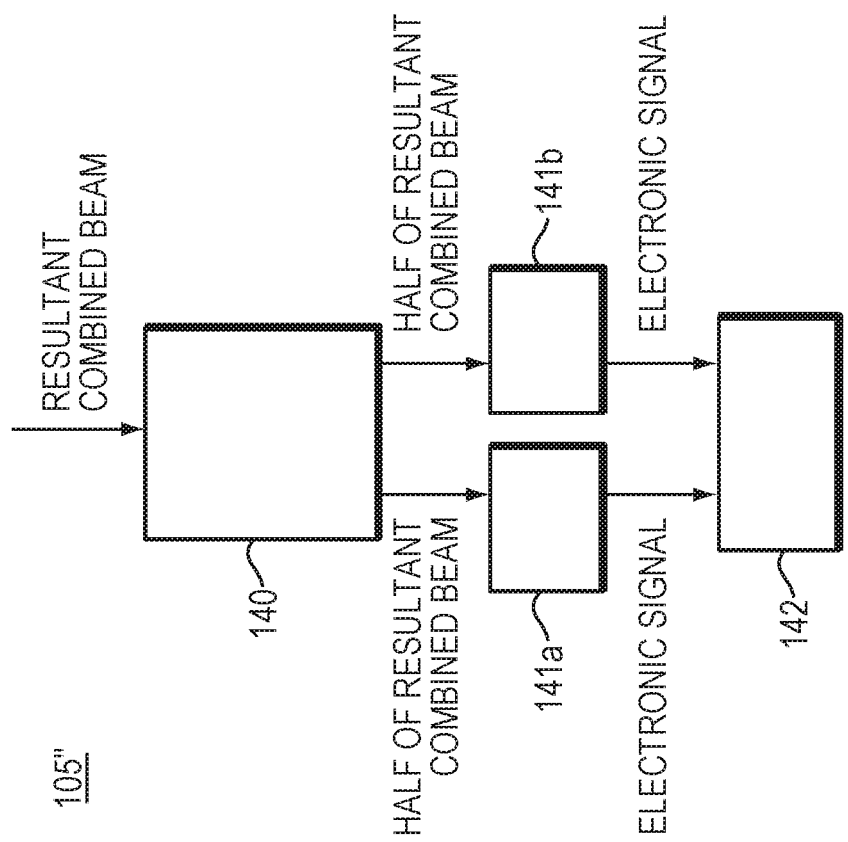
FIG. 6 is a schematic diagram of another embodiment photodetector of the second-order passive Sagnac optical gyroscope apparatuses of FIGS. 2A-3B including a pair of one-photon photoreceivers and a coincidence counter.

Referring to FIG. 6, according to a further embodiment, photodetector 105" of the second-order passive Sagnac optical gyroscope of the present disclosure includes a splitter 140 that receives the resultant combined beam and delivers two halves of the resultant combined beam to a pair of single-photon photoreceivers including first single-photon photoreceiver 141a and second single-photon photoreceiver 141b. The splitting performed by splitter 140 may be polarization insensitive, such that each half of the resultant, combined beam may include each of the cross-polarized beam components.

Splitter 140 may include lenses. Single-photon photoreceivers 141a and 141b may include photodiodes, avalanche photodiodes, or photomultiplier tubes as known in the art. The output electronic signals from the single-photon photoreceivers are delivered to coincidence counter 142 for detection of second-order interference.

Figure 7:
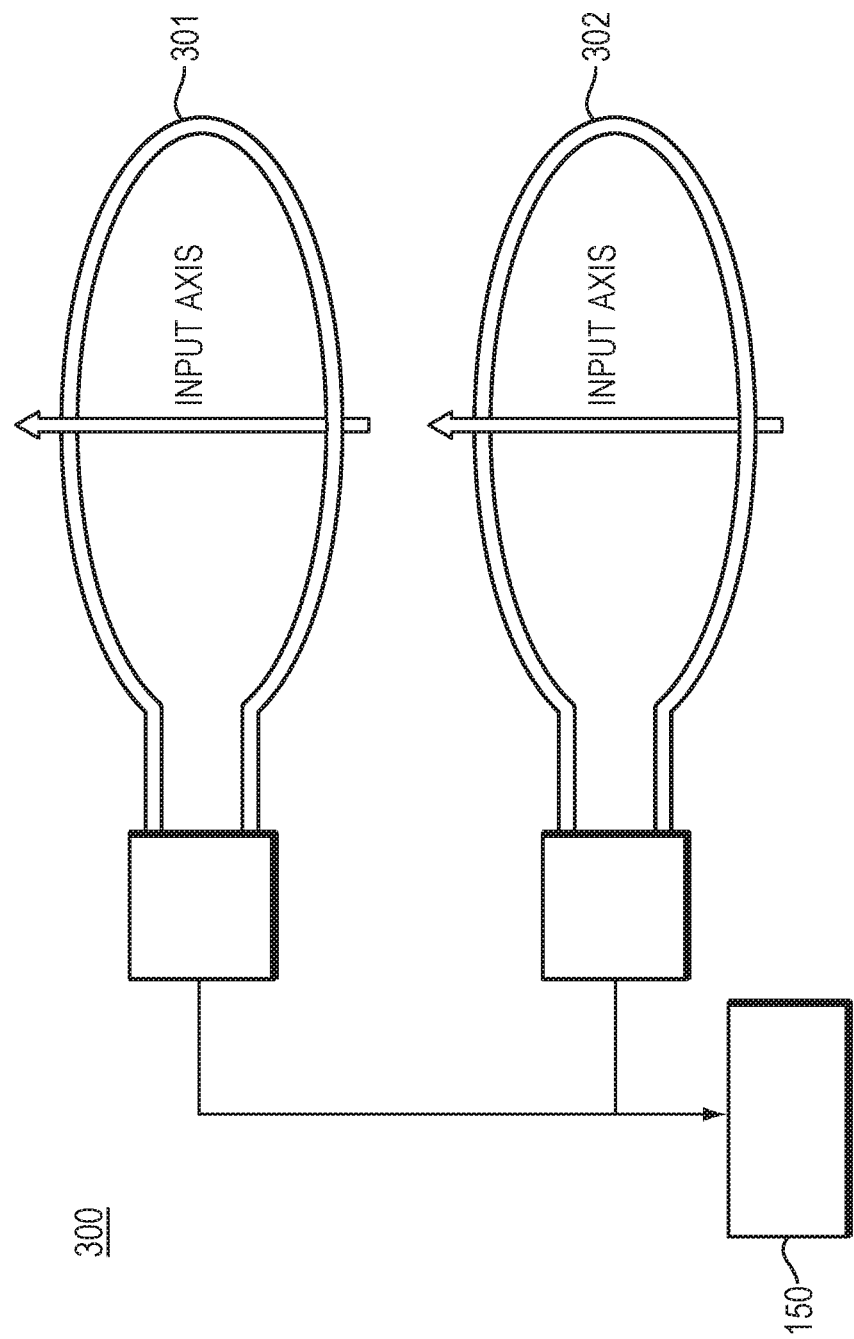
FIG. 7 is a schematic diagram of a multi-order passive Sagnac optical gyroscope apparatus in accordance to another embodiment of the present disclosure.

FIG. 7 is a schematic diagram of multi-order passive Sagnac optical gyroscope apparatus 300 in accordance to another embodiment of the present disclosure. Apparatus 300 includes the second-order passive Sagnac optical gyroscope apparatus 301 of the present disclosure, such as any of embodiment apparatuses 100a, 100b, and 200, configured to deliver a second-order Sagnac signal, and a first-order passive Sagnac optical gyroscope apparatus 302 as known in the art, configured to deliver a first-order Sagnac signal, whereby the input axes of the second- and first-order optical gyroscope apparatuses are aligned, completely or partially. The second- and first-order optical gyroscope apparatuses may share their light source, ring interferometer, or both, or alternatively may have separate light sources and ring interferometers. Apparatus 300 may further include processor 150 for interpreting the second-order Sagnac signal to stitch together the first-order Sagnac signal across one or more signal interruptions.

FIGS. 8A and 8B show exemplary normalized second-order interference detector responses for the embodiment second-order passive Sagnac optical gyroscope apparatuses of the present disclosure, having nonzero-area ring interferometers, along with corresponding exemplary normalized first-order interference detector responses. The primary abscissae at bottom of both FIGS. 8A and 8B show the dependence of the detector responses on the propagation time difference $\Delta\tau$ between the counter-propagating beams that arises from the Sagnac effect, while the secondary abscissae at top show the correspondence between propagation time difference $\Delta\tau$ and rotation flux $A\cdot\Omega$, where $A$ is the area of the ring interferometer and $\Omega$ is the rotation rate, given by $A\cdot\Omega = c^2\Delta\tau/4$, where $c$ is the speed of light.

The detector responses shown FIG. 8A assume that the light source has a Gaussian spectrum with 100 fs coherence time, corresponding to approximately 35 nm full width at half maximum (FWHM) optical bandwidth. Further, the detector responses shown in FIG. 8B assume the light source has a Gaussian spectrum with 50 femtosecond (fs) coherence time, corresponding to approximately 70 nm FWHM optical bandwidth. Both FIGS. 8A and 8B include insets to show the second- and first-order interference detector responses in greater detail for various ranges of propagation time difference (rotation flux).

From FIGS. 8A and 8B, one may appreciate that the second-order interference detector response monotonically decreases as the magnitude of the propagation time difference (rotation flux) increases, which is advantageous for unambiguously (assuming the sign of the rotation flux is known) relating a second-order interference detector response value to a rotation flux value over a large rotation flux input range (e.g., approximately ±100 m$^2$/s in FIG. 8A and approximately ±50 m$^2$/s in FIG. 8B), compared to the corresponding first-order interference detector response which is oscillatory and only unambiguous over one fringe period unless fringe counting is invoked.

Also from FIGS. 8A and 8B, one may further appreciate that the relationship between the second-order interference detector response and rotation flux is independent of the centroid wavelength of the light source (or, more generally, the resultant centroid wavelength detected after wavelength-dependent optical loss through the ring interferometer), and therefore does not suffer the sensitivity to environmental changes in centroid wavelength (e.g., due to temperature, ionizing radiation, etc.), as does the relationship between the first-order interference detector response and rotation flux wherein changes in centroid wavelength result in changes in the periodicity of the fringes. However, the relationship between the second-order interference detector response and rotation flux is dependent upon the optical bandwidth of the light source (or, more generally, the resultant optical bandwidth detected after wavelength-dependent optical loss through the ring interferometer).

Figure 9A:
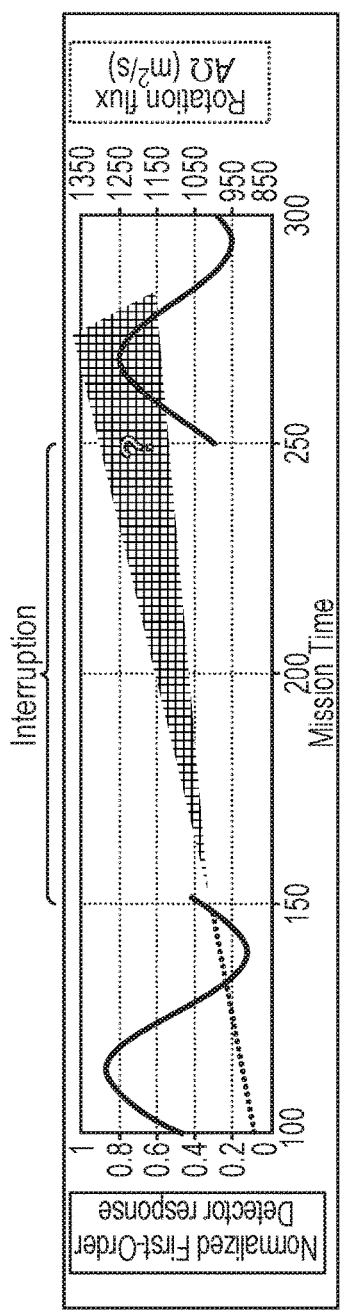
FIGS. 9A, 9B, and 9C show an exemplary mission timeline of the multi-order passive Sagnac optical gyroscope apparatus of FIG. 7.
Figure 9B:
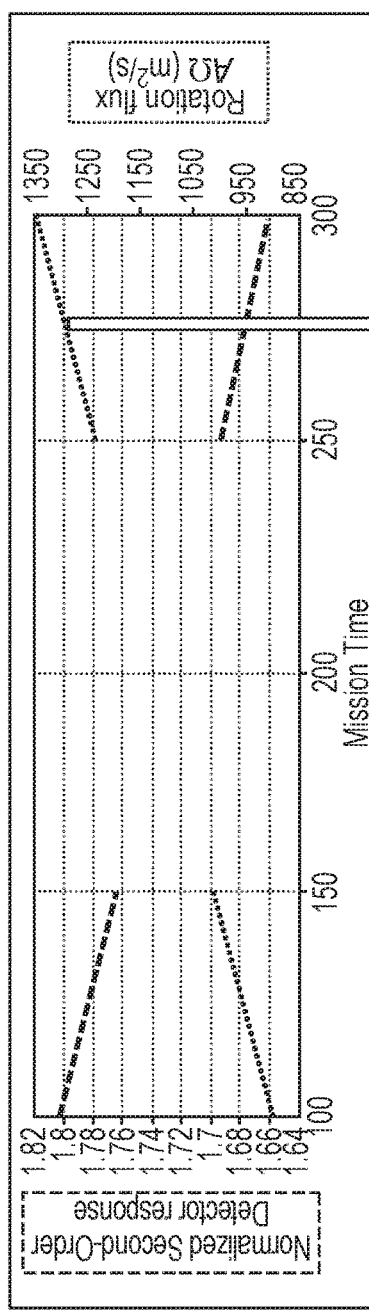
Figure 9C:
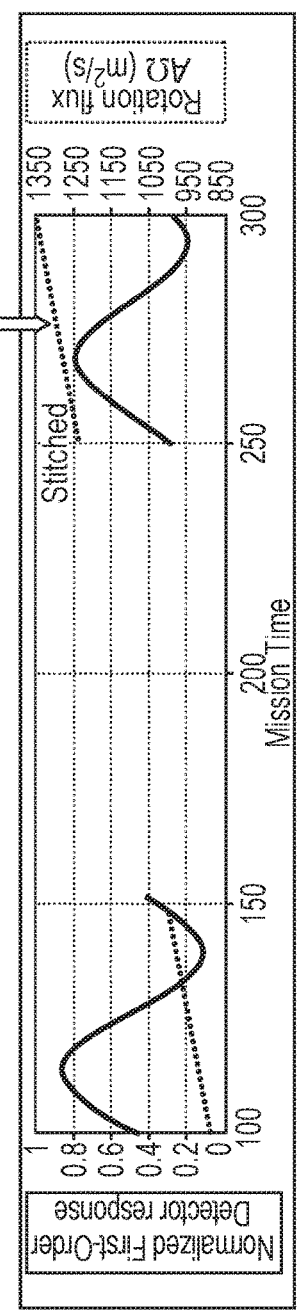

FIGS. 9A, 9B, and 9C show an exemplary mission timeline of multi-order passive Sagnac optical gyroscope apparatus 300 of FIG. 7. The abscissae of FIGS. 9A-9C show an exemplary mission time range from 100 units of time into the mission to 300 units of time, including an interruption in data between 150 and 250 units of time, as due to a circumvention and recovery function of apparatus 300, for example. The primary ordinates of FIGS. 9A and 9C at left show an exemplary normalized first-order detector response (solid curves), and the primary ordinate of FIG. 9B at left shows an exemplary normalized second-order detector response (dashed curve). The secondary ordinates of FIGS. 9A-9C show the corresponding exemplary rotation flux (dotted curve).

In the example shown in FIGS. 9A-9C, the rotation sensed by apparatus 300 is accelerating at a constant rate, though generally the rotation may be constant, or accelerating or decelerating at a constant or varying rate. FIG. 9A shows that without stitching of the data during the data interruption, the ambiguity inherent to relating the first-order interference to rotation flux limits the ability to determine the rotation flux after the data interruption. For example, it may be unknown whether the rotation accelerated so much during the interruption as to hop one or more fringes. FIG. 9B shows that because the relationship between second-order interference and rotation flux is unambiguous, the rotation flux after the data interruption is known, and therefore can be used to stitch the first-order interference data across the interruption as shown in FIG. 9C.

Figure 10:
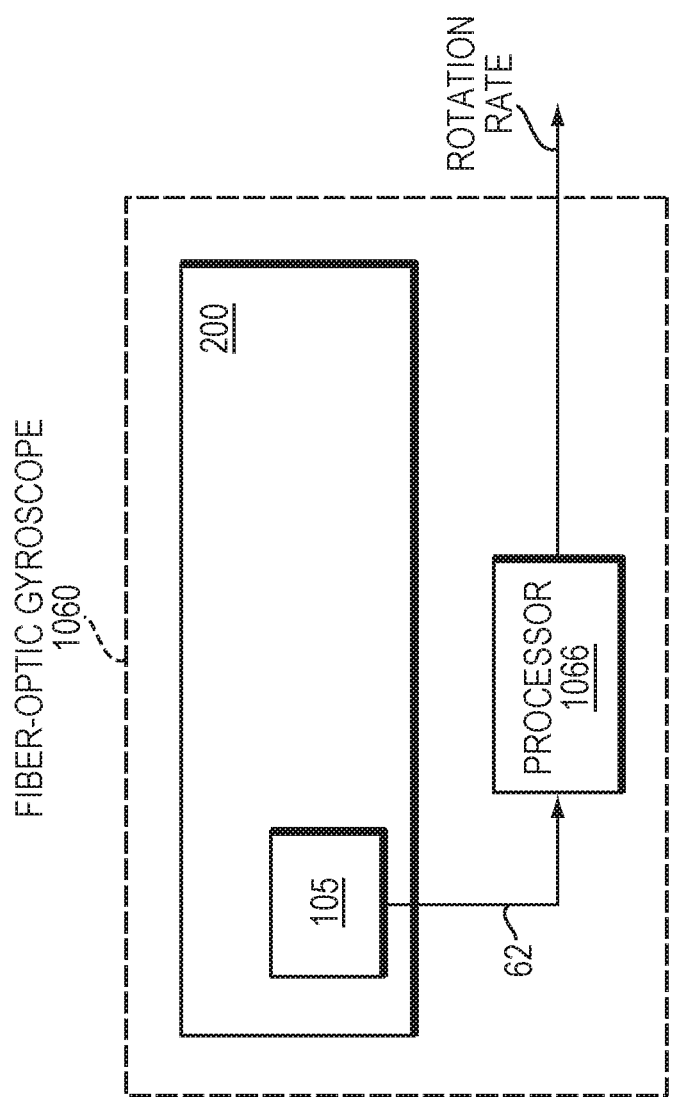
FIG. 10 is a block diagram illustrating a fiber-optic gyroscope incorporating an embodiment sensor and including a processor to determine rotation rate.

FIG. 10 is a block diagram illustrating a FOG 1060 that incorporates the embodiment passive ring interferometer sensor 60 of FIG. 1. The sensor 60 in this embodiment may generally be replaced by any of the embodiment sensors described herein. The FOG 1060 further includes a processor that receives the output 62 from the second-order coherence detector 105 and determines, based on the output 62, a rotation rate of the electromagnetic ring path 9 (illustrated in FIG. 1), which, in the case of the FOG 1060, is a coil of optical fiber constituting an optical ring path. As will be understood in view of this disclosure, the output 62 is based on the second-order coherence of the mutually cross-polarized optical waves received at the detector. The processor's determination of rotation rate is based, at least in part, upon this second-order coherence.

Figure 11:
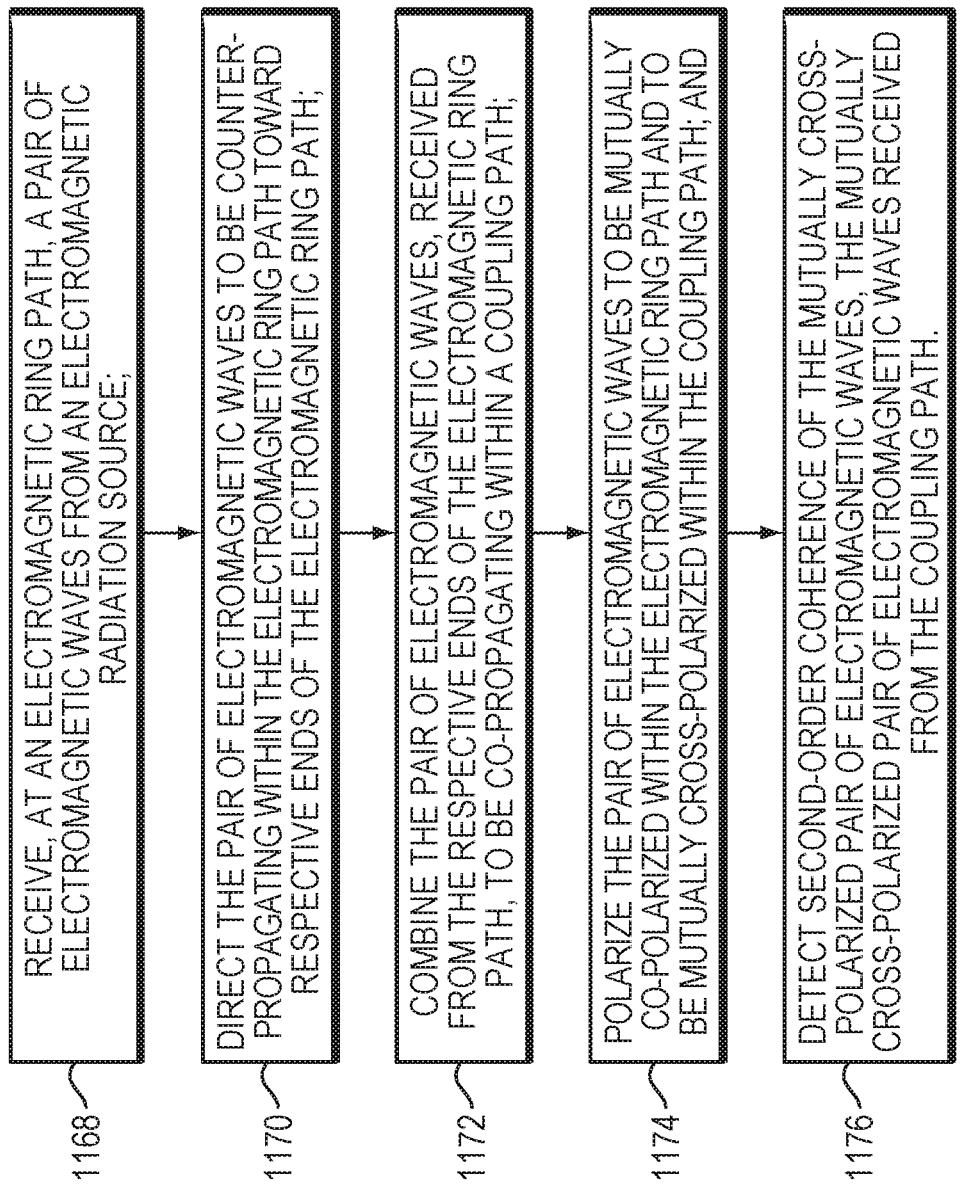
FIG. 11 is a flow diagram illustrating an embodiment procedure for passive ring interferometric sensing.

FIG. 11 is a flow diagram illustrating an embodiment procedure for passive ring interferometric sensing. At 1168, a pair of electromagnetic waves is received, at an electromagnetic ring path, from an electromagnetic radiation source. At 1170, the pair of electromagnetic waves is directed to be counter-propagating within the electromagnetic ring path toward respective ends of the electromagnetic ring path. At 1172, the pair of electromagnetic waves, received from the respective ends of the electromagnetic ring path, is combined to be co-propagating within a coupling path.

Further in FIG. 11, at 1174, the pair of electromagnetic waves is polarized to be mutually co-polarized within the electromagnetic ring path and to be mutually cross-polarized within the coupling path. At 1176, second-order coherence of the mutually cross-polarized pair of electromagnetic waves is detected, the mutually cross-polarized pair of electromagnetic waves received from the coupling path. Embodiment procedures may include use of any of the various optional features described herein in reference to any other embodiment.

As described hereinabove, embodiment methods may include providing a light source, providing a ring interferometer, providing a photodetector, and detecting second-order interference, and may further include detecting first-order interference and using the detected second-order interference to stitch together first-order interference data across a data interruption.

The present disclosure has been described in detail with particular reference to certain preferred embodiments thereof, but it will be understood that variations and modifications can be effected within the scope of the present disclosure as described above by a person of ordinary skill in the art without departing from the scope of the present disclosure.

The teachings of all patents, published applications and references cited herein are incorporated by reference in their entirety.

What is claimed is:

1. A passive ring interferometer sensor comprising:
an electromagnetic ring path configured to receive a pair of electromagnetic waves from an electromagnetic radiation source and to direct the pair of electromagnetic waves to be counter-propagating within the electromagnetic ring path toward respective ends of the electromagnetic ring path;
a combination junction configured to receive the pair of electromagnetic waves from the respective ends of the electromagnetic ring path and to combine the pair of electromagnetic waves to be co-propagating within a coupling path;
polarization elements configured to set the pair of electromagnetic waves to be mutually co-polarized within the electromagnetic ring path and to be mutually cross-polarized within the coupling path; and
a detector configured to receive the mutually cross-polarized pair of electromagnetic waves from the coupling path and to detect second-order coherence of the mutually cross-polarized electromagnetic waves.

2. The sensor of claim 1, wherein the electromagnetic ring path is an ultraviolet, x-ray, or gamma-ray ring path; the pair of electromagnetic waves is a pair of ultraviolet, x-ray, or gamma-ray waves; and the electromagnetic radiation source is an ultraviolet, x-ray, or gamma-ray source.

3. The sensor of claim 1, wherein the electromagnetic ring path is an infrared or microwave-frequency ring path; the pair of electromagnetic waves is a pair of infrared or microwave-frequency waves; and the electromagnetic radiation source is an infrared or microwave-frequency source.

4. The sensor of claim 1, wherein the electromagnetic ring path is an optical ring path, and wherein the pair of electromagnetic waves is a pair of optical waves, the sensor further comprising the electromagnetic radiation source, wherein the electromagnetic radiation source is a light source.

5. The sensor of claim 4, wherein the light source is a broadband light source and the light is broadband source light, the sensor further including at least one optical phase modulator configured to receive the broadband source light and to deliver conditioned broadband output light having at least one of reduced spectral modulation depth and increased central degree of nth-order temporal coherence, characterized by a phase noise modulation enhancement factor, where n is an integer greater than or equal to 2, relative to the broadband source light, the pair of optical waves formed from the conditioned broadband output light.

6. The sensor of claim 4, wherein the light source is a narrowband light source and the light is narrowband source light.

7. A fiber optic gyroscope (FOG) comprising the sensor of claim 4, the FOG further including a processor configured to determine, from the second-order coherence of the mutually cross-polarized optical waves, a rotation rate of the optical ring path.

8. The sensor of claim 4, wherein the optical ring path includes at least one of a bulk optic configured to direct the pair of optical waves therein; a bulk optic configured to direct the pair of optical waves through free space, at least a portion of the optical ring path being a free-space path; an integrated optical element; and an optical fiber or other waveguide.

9. The sensor of claim 4, wherein the coupling path includes at least one of a bulk optic or free space optical path, an integrated waveguide element, or an optical fiber or other waveguide.

10. The sensor of claim 4, wherein the optical ring path includes a polarizing or polarization-maintaining optical fiber or other waveguide.

11. The sensor of claim 1, wherein the detector is a two-photon-absorption-based detector.

12. The sensor of claim 1, wherein the detector is a coincidence counting detector.

13. The sensor of claim 1, wherein the electromagnetic radiation source is configured to output electromagnetic radiation with a central degree of second-order temporal coherence greater than 1.0.

14. The sensor of claim 13, wherein the electromagnetic radiation source is configured to output electromagnetic radiation with a central degree of second-order temporal coherence greater than 2.0.

15. The sensor of claim 1, wherein the polarization elements are Faraday rotators.

16. The sensor of claim 1, wherein the pair of electromagnetic waves are linearly polarized within the electromagnetic ring path, within the coupling path, or both.

17. The sensor of claim 1, wherein the combination junction is also a splitter junction configured to split electromagnetic radiation from the electromagnetic radiation source to form the pair of electromagnetic waves.

18. The sensor of claim 1, wherein the combination junction includes at least one of a waveguide device and a bulk optic beam combiner.

19. A method of passive ring interferometric sensing, the method comprising:
receiving, at an electromagnetic ring path, a pair of electromagnetic waves from an electromagnetic radiation source;

directing the pair of electromagnetic waves to be counter-propagating within the electromagnetic ring path toward respective ends of the electromagnetic ring path;

combining the pair of electromagnetic waves, received from the respective ends of the electromagnetic ring path, to be co-propagating within a coupling path;

polarizing the pair of electromagnetic waves to be mutually co-polarized within the electromagnetic ring path and to be mutually cross-polarized within the coupling path; and detecting second-order coherence of the mutually cross-polarized pair of electromagnetic waves, the mutually cross-polarized pair of electromagnetic waves received from the coupling path.

20. A method of sensing rotation with a fiber optic gyroscope (FOG), the method comprising:

the method of passive ring interferometric sensing of claim 19, wherein the electromagnetic ring path is an optical ring path, the pair of electromagnetic waves is a pair of optical waves, and the electromagnetic radiation source is a light source; and determining a rotation of the optical ring path from the second-order coherence of the mutually cross-polarized optical waves.

21. The method of claim 19, wherein detecting second-order coherence includes using two-photon absorption.

22. The method of claim 19, wherein detecting second-order coherence includes using coincidence counting.

23. The method of claim 19, wherein polarizing the pair of electromagnetic waves includes using Faraday rotation.

24. A device comprising:

means for receiving, at an electromagnetic ring path, a pair of electromagnetic waves from an electromagnetic radiation source;

means for directing the pair of electromagnetic waves to be counter-propagating within the electromagnetic ring path toward respective ends of the electromagnetic ring path;

means for combining the pair of electromagnetic waves, received from the respective ends of the electromagnetic ring path, to be co-propagating within a coupling path;

means for polarizing the pair of electromagnetic waves to be mutually co-polarized within the electromagnetic ring path and to be mutually cross-polarized within the coupling path; and means for detecting second-order coherence of the mutually cross-polarized pair of electromagnetic waves, the mutually cross-polarized pair of electromagnetic waves received from the coupling path.

* * * * *